United States Patent [19]

Ohno

[11] 4,428,755
[45] Jan. 31, 1984

[54] PROCESS FOR THE PRODUCTION OF SILICONE CARBIDE COMPOSITE

[75] Inventor: John M. Ohno, Plymouth, Mich.

[73] Assignee: General Electric Company

[21] Appl. No.: 313,241

[22] Filed: Oct. 20, 1981

Related U.S. Application Data

[63] Continuation of Ser. No. 167,019, Jul. 9, 1980, abandoned.

[51] Int. Cl.$^3$ .......................... C04B 31/16; C09C 1/68
[52] U.S. Cl. ........................................ 51/307; 51/308; 264/101
[58] Field of Search .................... 51/307, 308; 264/56, 264/101, 345

[56] References Cited

U.S. PATENT DOCUMENTS

| | | | |
|---|---|---|---|
| 2,938,807 | 5/1960 | Anderson | 106/44 |
| 4,018,631 | 4/1977 | Hale | 148/31.5 |
| 4,063,909 | 12/1977 | Mitchell | 51/309 |
| 4,120,731 | 10/1978 | Hillig et al. | 106/44 |
| 4,124,401 | 11/1978 | Lee et al. | 106/44 |
| 4,151,686 | 5/1979 | Lee et al. | 51/307 |
| 4,167,399 | 9/1979 | Lee et al. | 51/307 |
| 4,168,957 | 9/1979 | Lee et al. | 51/309 |
| 4,171,339 | 10/1979 | Lee et al. | 264/322 |
| 4,173,614 | 11/1979 | Lee et al. | 264/332 |
| 4,219,339 | 8/1980 | Wilson | 51/307 |
| 4,220,455 | 9/1980 | St. Pierre et al. | 51/295 |
| 4,220,677 | 9/1980 | Fedoseev et al. | 427/215 |
| 4,231,195 | 11/1980 | DeVries et al. | 51/307 |
| 4,238,433 | 12/1980 | Hillig et al. | 264/60 |
| 4,241,135 | 12/1980 | Lee et al. | 428/332 |
| 4,242,106 | 12/1980 | Morelock | 51/307 |
| 4,268,582 | 5/1981 | Hale et al. | 428/446 |

FOREIGN PATENT DOCUMENTS 2006733 5/1979 United Kingdom.

OTHER PUBLICATIONS

EPA (0 012 966) Application #79105211.1, 09.07.80, Bullentin 80/14.
EPA (0 010 257) Application #79103889.6, 30.04.80, Bullentin 80/9.

Primary Examiner—Donald E. Czaja
Assistant Examiner—W. Thompson
Attorney, Agent, or Firm—Hedman, Casella, Gisbson, Costigan & Hoare

[57] ABSTRACT

Sintered silicon carbide composites containing diamond crystals are made through a process wherein a first dispersion of diamond crystals and carbon black in paraffin is formed, along with a second dispersion of carbon fiber, carbon black and filler in paraffin. One of the dispersions is compacted to produce a physically stable intermediate compact which is then recompacted with the remaining dispersion to produce a binary compact. The latter is subjected to a vacuum for a period of time at a temperature sufficient to vaporize essentially all of the paraffin, after which the binary compact is infiltrated with liquid silicon and sintered to produce a $\beta$-silicon carbide binder uniting the resulting composite.

7 Claims, 6 Drawing Figures

PROCESS FOR THE PRODUCTION OF SILICONE CARBIDE COMPOSITE

This is a continuation of application Ser. No. 167,019, filed July 9, 1980 now abandoned.

BACKGROUND OF THE INVENTION

Articles composed of materials having refractory characteristics, hardness and resistance to erosion have myriad important uses. Representative materials are described in U.S. Pat. No. 2,938,807 of Andersen.

Reaction sintering of $\beta$-silicon caribide and $\alpha$-silicon carbide has been known for making high temperature components. For example, $\beta$-silicon carbide is described as an excellent binder in the Andersen U.S. Pat. No. 2,938,807, however, no diamond is incorporated in this silicon carbide technology.

Another useful component of these materials would be diamond. Its superior properties of, for example, hardness have long been appreciated. A satisfactory means of incorporating diamond into such articles would be of a significant advantage and such is an object of the process and product of the present invention.

A metal is used to bind diamond crystals in U.S. Pat. No. 4,063,909 to Robert D. Mitchell. Such metal may be, for example, Co, Fe, Ni, Pt, Ti, Cr, Ta and alloys containing one or more of these metals.

The above and other patents in the area of bonding diamond crystals depend on hot-press technology, as for example described in U.S. Pat. No. 4,124,401 to Lee et al, U.S. Pat. No. 4,167,399 to Lee et al, and U.S. Pat. No. 4,173,614 to Lee et al, all of which patents are assigned to the assignee of the present invention.

Many of these problems have been overcome by the invention disclosed in U.S. patent application Ser. No. 167,196, filed July 9, 1980, filed currently herewith by John Michio Ohno. The disclosure of this application is incorporated herein by reference.

In brief, that application describes bi-layer diamond composites having a special binder of $\beta$-silicon carbide. That binder forms a matrix throughout the composite so as both to hold the diamond crystals and to unite the composite layers. The composites are formed by a process comprising:

(a) forming a first dispersion of diamond crystals and carbon black in paraffin;

(b) forming a second dispersion of carbon fiber, carbon black and filler in paraffin;

(c) compacting said dispersions together to produce an integral bi-layer composite;

(d) subjecting said composite to a vacuum for a period of time at a temperature sufficient to vaporize essentially all of said paraffin;

(e) liquefying said silicon to cause infiltration into both layers;

(f) uniting the layers of said composite with liquid silicon; and (g) sintering the composite and infiltrated silicon under conditions sufficient to produce a $\beta$-silicon carbide binder uniting said composite.

Notwithstanding that invention, however, various limitations on the construction of shaped diamond composite useful for these purposes remain. In particular, these involve placement of diamond crystals at desired surface locations.

INTRODUCTION TO THE INVENTION

The present invention employs diamond crystal, SiC crystal or other filler crystals, carbon black, carbon fiber and paraffin to produce bodies with sintered diamond selectively placed on the lateral periphery of a composite. Through this preferential peripheral placement (especially at the cutting edges), composites having increased wear resistance for reduced unit costs are obtained.

The composites of the present invention are prepared by the steps of:

(a) forming a first dispersion of diamond crystals and carbon black in paraffin;

(b) forming a second dispersion of carbon fiber, carbon black and filler in paraffin;

(c) compacting one of said dispersions to produce a physically stable intermediate compact;

(d) recompacting said intermediate with the remaining dispersion to produce a binary compact;

(e) subjecting said binary compact to a vacuum for a period of time at a temperature sufficient to vaporize essentially all of said paraffin;

(f) infiltrating said binary compact with liquid silicon; and (g) sintering the binary compact containing infiltrated silicon under conditions sufficient to produce a $\beta$-silicon carbide binder uniting said composite.

As a result of this process, a bonded composite having a superior wear resistance surface layer is produced. That diamond crystal containing surface, held tightly by a strong silicon carbide bonding matrix, is particularly suitable as a tooling or cutting edge.

DESCRIPTION OF THE INVENTION

The present shaped composites may have any of the geometric shapes known for such cutting utilities. In general, these composites share the feature that, during use, they are rotated about a central axis while their circumferential working sides or edges are oriented either parallel to, or intersecting, that axis.

Certain preferred embodiments of the present invention involve some of these shapes. For example, the composite may have two essentially parallel and planar surfaces spaced a predetermined distance apart. These surfaces represent the anterior and posterior surfaces of the composite; their distance of separation, its depth. This depth is ordinarily from 0.1 to 0.2 cm.

Figures 5, 6:
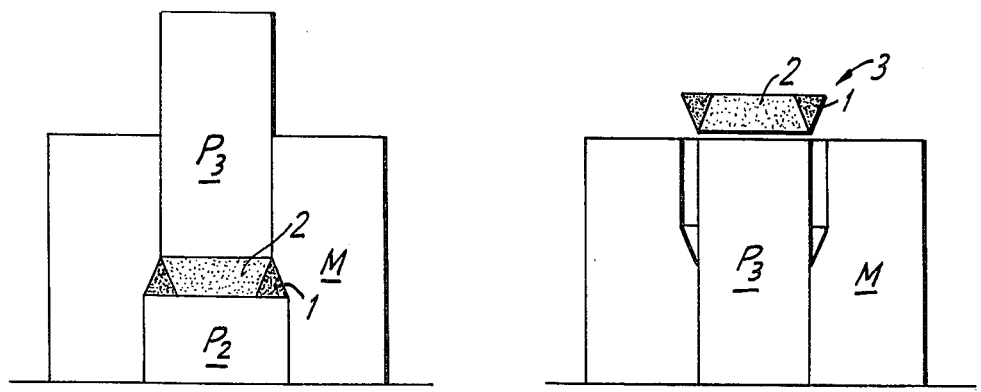

The periphery of these composites is formed by sides connecting to edges of the surfaces. These sides generally form (as shown at the edge formed with a surface) either a circle or a convex regular polygon (in this last instance, each separate side is desirably essentially rectangular in appearance). The sides of neutral cutting inserts are parallel to an axis normal to the planar surfaces. However, the sides of positive cutting inserts have a relief angle, as shown in FIGS. 5 and 6. Therefore, each separate side is trapezoidal in configuration.

Figure 1:
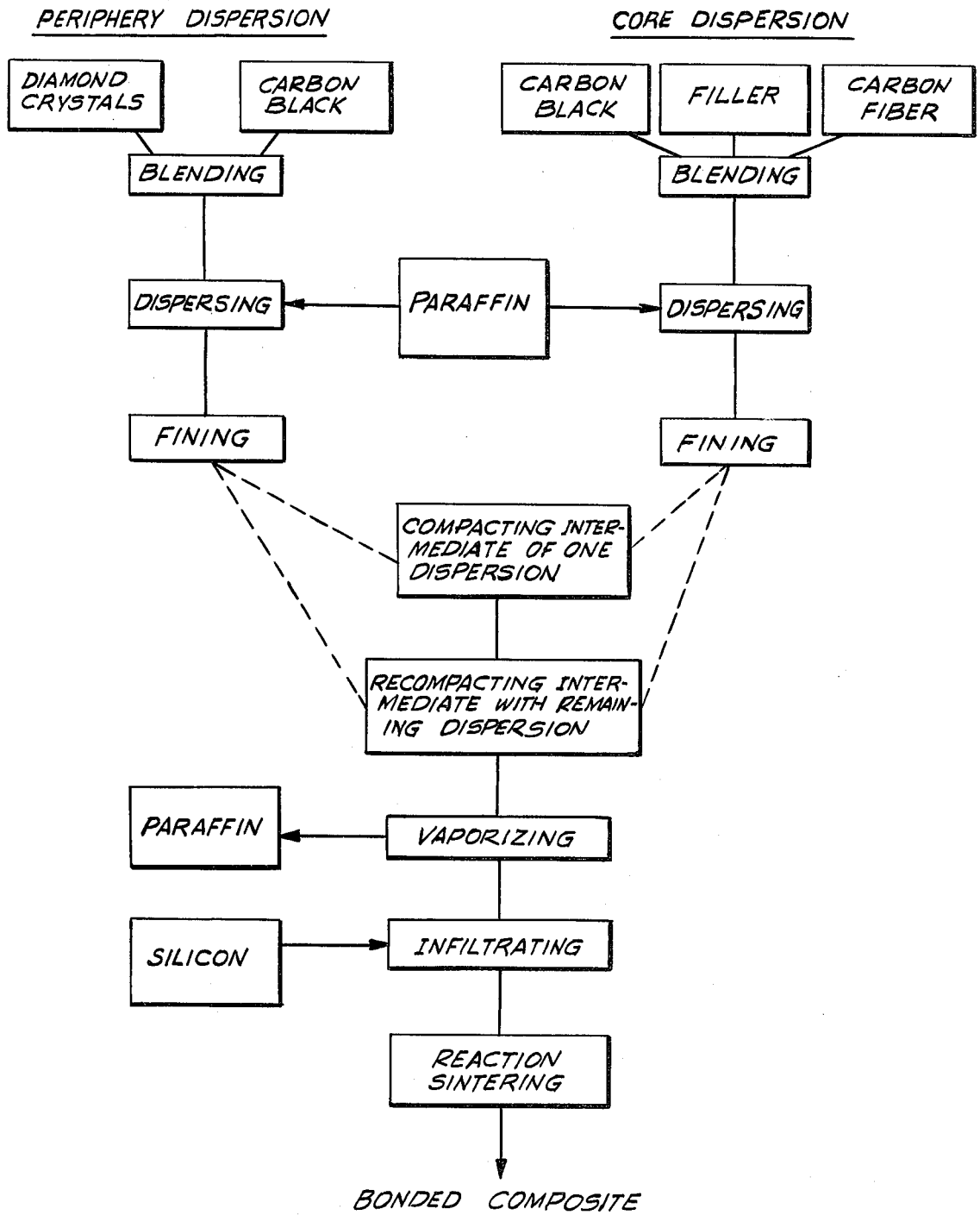
FIG. 1 is a schematic diagram of the process of the present invention.

The present process for preparing silicon carbide composites is diagrammed in representative manner in FIG. 1. As shown by that diagram, one of the initial steps involves the formation of a dispersion of diamond crystals and carbon black in paraffin.

For various reasons, small crystals are usually employe in this first dispersion. In a preferred embodiment, the diamonds employed include crystals having a size less than 400 mesh. Crystals of this preferred size will, when bonded with β-silicon carbide, exhibit superior resistance to chipping. In addition, they provide sharp edges having desirable relief angles for cutting inserts and other wear components.

To the diamond crystals must be added carbon black. This carbon serves subsequently by reacting to yield β-silicon carbide for the bonding matrix of the present composites. This carbon black is desirably of high purity to reduce the presence of contaminents. In particular, its sulfur content should be low to avoid possible side reactions during subsequent processing. Although varying amounts of carbon black are permissible, from 1% to 3%, most preferably about 2%, by weight of diamond has proven optimum.

The paraffin utilized in the first (or peripheral) dispersion may be any of the hydrocarbon waxes encompassed by the common meaning of this term. Again a high purity hydrocarbon should be employed to avoid possible harmful residue. For ease of admixture, a liquid paraffin is employed. This may, however, be accomplished by operating under a temperature sufficiently high to melt a paraffin which is ordinarily solid under ambient conditions. The amount of paraffin employed is not critical as it is subsequently removed. It generally constitutes from 3% to 6% by total weight of the first dispersion.

The foregoing constituents may simply be mixed together to form the first dispersion. A very intimate and homogeneous dispersion is, however, preferred. Consequently, a step-wise technique such as that outlined in the flow diagram of FIG. 1 is desirable.

In accordance with that technique, the diamond crystals and carbon black are blended to permit an even coating of the crystal surfaces. Only after this step is the paraffin mixed into the blend. Thereafter, the first dispersion is preferably subjected to a further step of fining, as by grinding. However, the admixture of the second dispersion containing carbon fiber, carbon black, and paraffin may be passed through a screen of, for example, about 20 mesh to improve admixture and reduce any agglomeration which may have occurred.

The paraffin and carbon black utilized in the second (or core) dispersion of the process may be any of these previously described. For convenience, the same ones are ordinarily utilized in forming both the first and second dispersions. Generally, the second dispersion also contains from 3% to 6% paraffin and 2% to 4% carbon black by weight. The amount of carbon black, particularly in the first dispersion, the quality and type of carbon black, are also critical. For example, sulfur contamination in carbon black must be avoided.

The carbon fiber employed is desirable of very small size to facilitate homogeneous admixture and, in particular, the fining operation. The sizes of fiber are preferably of from 6 to 30 microns in diameter, and from 250 to 500 microns in length.

The filler is provided to increase bulk and also to improve the compressibility of the powder mix containing fiber. It is highly desirable for a number of applications. Although such a filler may comprise any material which is stable under the conditions to which it is subjected during sintering and use, fine α or β silicon carbide is preferred. Ordinarily, from 40% to 75% of filler by total weight of the second dispersion is employed.

As is the case in production of the first dispersion, the paraffin, carbon black, carbon fiber and filler should be intimately admixed. They are also desirably screened as previously described to insure fineness.

Due to the presence of paraffin, each dispersion is independently capable of being compacted (or molded) to desired shape(s). Application of pressure provides a compacted dispersion with sufficient "green strength" or physical stability to retain its imparted shape during subsequent operations and/or handling. The amount of pressure applied may vary widely, although at least 2300 kg/cm$^2$ is preferred.

In the process of this invention one or the other of the two dispersions is compacted to form that portion of the composite with which it will ultimately correspond. This compacted dispersion therefore constitutes an intermediate compact identical in shape and volume (but not composition) with a portion—such as a core, cutting edge or the like—of the final composite.

After the intermediate compact has been formed from one dispersion, it may be recompacted with the remaining dispersion. For this step, the intermediate compact may be positioned where desired within a mold having the shape of the desired composite. The remaining dispersion may then be added to the mold to complete filling. The application of pressure as previously described then yields a physically stable binary compact which has the same shape as the ultimate bonded composite.

These alternative routes for the dispersions are depicted in FIG. 1 by the two sets of dashed lines. One dispersion must be compacted in each of the foregoing steps, but their sequence is not important.

FIGS. 2-6 illustrate in greater detail a preferred sequence of steps for this operation of forming a binary compact from the two dispersions.

Figure 2:
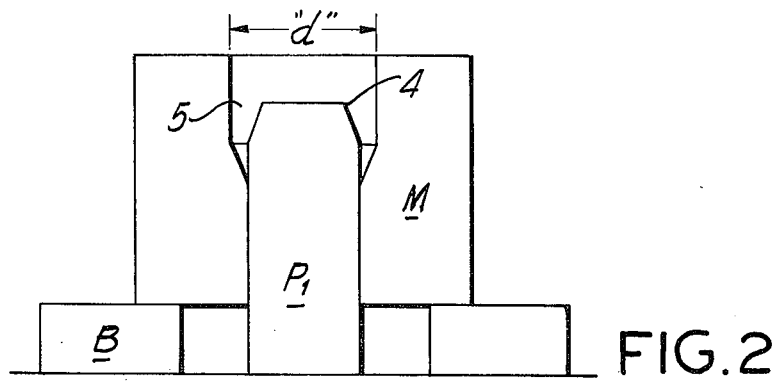
FIGS. 2–6 are sequential, illustrative depictions of a preferred approach and particular apparatus useful in the process of the present invention.
Figure 3:
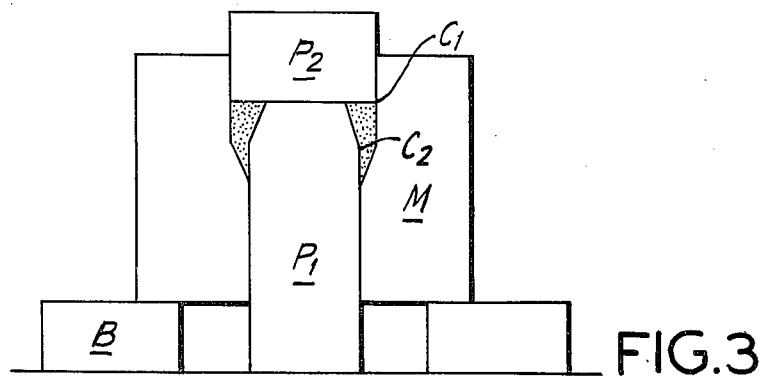
Figure 4:
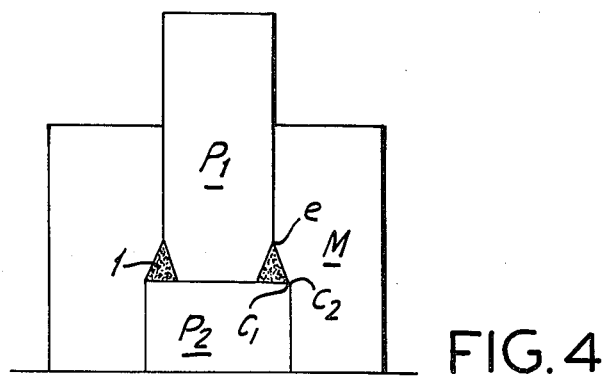

Referring to FIG. 2, the apparatus which may be employed in the subject process includes a circular mold M which is shown in cross-section and is mounted on a base ring B. Mold M contains a tightly fitting, cylindrical plunger $P_1$ which has a symmetrical end tip 4. Due to the difference between the diameter "d" of the cylindrical bore of mold M and the diameter of the end tip 4, an annular gap 5 is created. This gap 5 is filled or loaded with a dispersion containing diamond crystals, and a second plunger $P_2$ is placed into the bore of the mold M in abutment with plunger $P_1$ (see FIG. 3). Next, the apparatus is reversed and plunger $P_2$ is forced upwardly against plunger $P_1$ and moves from point $C_1$ to point $C_2$ thereby forming a ring-like intermediate compact, having a peripheral apex e, and designated by the numeral 1 in FIG. 4.

In the next step of the subject process, plunger $P_1$ is removed thereby resulting in a central cavity within the ring-like compact 1, and this cavity is filled or loaded with the second dispersion. As shown in FIG. 5, under pressure of a third plunger $P_3$, the second dispersion forms a core 2 which is united with the intermediate compact 1 obtained from the first dispersion.

FIG. 6 illustrates the binary compact 3 after ejection from mold M by advancing the remaining plunger $P_3$. The compact 3 is physically stable despite its two strata comprising a peripheral ring 1 formed from the first dispersion and a central core 2 formed from the second.

One thing of great importance in these operations is the shape(s) of the mold(s). A significant advantage of the present invention lies in the fact that a shape impressed upon a compact during molding ordinarily need not subsequently be altered. Thus the time consuming and difficult steps of finishing to a desired shape, common with other refractory materials, may be eliminated in accordance with the present process. The mold(s) and/or plunger(s) should therefore have the configuration(s) desired for the ultimate portion of the body to which the compact or composite corresponds.

Once molded to the desired shape, the binary compact is (as may be seen in FIG. 1) subjected to vacuum and temperature conditions sufficient to vaporize the paraffin from its entire volume. Suitable conditions are, of course, dependent upon the particular paraffin present. Generally, however, a pressure of less than 200µ and temperature of about 500° C. are utilized. Alternatively, another temperature and a correspondingly varied vacuum may be employed.

The vaporization of the paraffin is preferably conducted slowly. This avoids, for example, violent boiling and/or build-up of gaseous pressure within the composite. Accordingly, conditions requiring at least 10 minutes and preferably from 10 to 15 minutes for the essentially complete removal of the paraffin are preferred.

The compact is next infiltrated with liquid silicon. There must be sufficient elemental silicon present to permit, under the conditions of sintering, infiltration of silicon to, and reaction with, substantially all of the carbon black and carbon fiber of the compact. There may also be excess silicon. It is not detrimental if, after sintering, a small amount of free silicon remains within the resultant composite. Up to about 14%, preferably from 5% to 12%, excess silicon is even desirable to ensure substantially complete reaction.

The operation of bonding a compact to create a composite actually involves a series of steps, all of which may occur essentially simultaneously. These steps include melting of the silicon, infiltration of molten silicon into the compact and reaction of infiltrated silicon with both the carbon black and carbon fiber to produce β-silicon carbide through the resultant composite.

To induce this last set of reactions between silicon and carbon, a minimum temperature of at least about 1450° C. is required. Higher temperatures may also be utilized. A maximum of about 1490° C. is, however, preferred to avoid graphitization of the diamond crystals. Normally the compact should be maintained at a temperature within this range for at least 10 minutes at 1490° C., preferably at least 30 minutes at 1450°–1490° C. This ensures substantially complete reaction of available carbon black and carbon fiber with infiltrated silicon. Consequently, the entire operation may proceed essentially simultaneously under a single set of conditions or in a sequential, step-wise progression, as desired.

The process of the present invention does not require application of the pressure during silicon infiltration or sintering. This, of course, means that there is no need for a hot press mold at this stage of the present process. Such other processes as are, for example, described in U.S. Pat. No. 4,124,401 of Lee et al, rely upon a pressure upwards of 20,000 psi for this portion of the process.

Once reaction between carbon black and carbon fiber with silicon has essentially ceased, the bonded product composite may be cooled. If, as desired, the composite was formed in the desired shape, it is ready for use. Most commonly, therefore, it will be configured as a cutting tool, wire drawing die or other conventional article for which its properties are particularly desirable.

These bonded composites generally contain strata which evidence their process of production. In the main, the strata are evidenced by the filler of the second dispersion (or core) and by the diamond crystals on its surface. Uniting these different strata is the bonding matrix of β-silicon carbide. Thus, if the filler of the second dispersion is α-silicon carbide as preferred, that layer may consist essentially of α- and β-silicon carbide.

The peripheral side surface portion derived from the first dispersion ordinarily consists predominantly of diamond crystals and a small amount of β-silicon carbide. Most characteristic of this layer is the presence of its diamond crystals, preferably in the range of from about 75% to 90% by weight.

A residue of unreacted constituents—generally from about 5% to 14% silicon and up to about 0.2% carbon by weight—may also exist. The silicon residue may be present throughout the composite. However, residual carbon in the portion derived from the first dispersion must be less than 0.05% by weight.

It is to be understood that changes may be made in the particular embodiment of the invention in light of the above teachings, but that these will be within the full scope of the invention is defined by the appended claims.

I claim:

1. A process for preparing a bonded composite comprising:
   (a) blending diamond crystals and carbon black to permit an even coating of said diamond crystal surfaces;
   (b) forming a first dispersion of said blended diamond crystals and carbon black in paraffin;
   (c) forming a second dispersion of carbon fiber, carbon black and filler in paraffin;
   (d) compacting one of said dispersions to produce a physically stable intermediate compact;
   (e) recompacting said intermediate compact with the remaining dispersion to produce a binary compact;
   (f) subjecting said binary compact to a vacuum for a period of time at a temperature sufficient to vaporize essentially all of said paraffin;
   (g) infiltrating said binary compact with liquid silicon; and
   (h) sintering the binary compact containing infiltrated silicon under conditions sufficient to produce a β-silicon carbide binder uniting said composite.

2. The process of claim 1, wherein the composite has two essentially parallel and planar surfaces a predetermined distance apart, the connecting peripheral sides of said composite forming a circle at each of said surfaces.

3. The process of claim 2 wherein the core of the composite is formed from the second dispersion and the sides comprise a peripheral layer formed from the first dispersion.

4. The process of claim 3, wherein the layer has a radially-measured thickness at one surface which is at least twice that at the other surface.

5. The process of claim 2 wherein the circular sides are parallel to an axis normal to the planar surfaces.

6. The process of claim 1, wherein the first dispersion is compacted to form the intermediate compact and, upon recompacting with the second dispersion, said intermediate compact forms the side periphery portion of the composite.

7. The process of claim 1, wherein the second dispersion is compacted to form the intermediate compact and, upon recompacting, the first dispersion forms side periphery portion of the composite.

* * * * *